United States Patent [19]

Yamashita

[11] Patent Number: 5,275,146

[45] Date of Patent: Jan. 4, 1994

[54] HEATING DEVICE AND SYSTEM FOR AN INTERNAL COMBUSTION ENGINE

[75] Inventor: Takahisa Yamashita, Shizuoka, Japan

[73] Assignee: Texas Instruments Incorporated, Dallas, Tex.

[21] Appl. No.: 72,827

[22] Filed: Jun. 7, 1993

[30] Foreign Application Priority Data

Jul. 28, 1992 [JP] Japan ................................. 4-220808

[51] Int. Cl.⁵ ............................................ F02M 31/00
[52] U.S. Cl. ..................................... 123/549; 123/552
[58] Field of Search .............. 123/549, 557, 543, 547, 123/546, 552; 261/139

[56] References Cited

U.S. PATENT DOCUMENTS

| | | |
|---|---|---|
| 4,347,826 | 9/1982 | Nomura et al. ...................... 123/549 |
| 4,628,889 | 12/1986 | van der Ploeg ...................... 123/549 |
| 4,834,053 | 5/1989 | van der Ploeg ...................... 123/549 |
| 5,078,115 | 1/1992 | Yamashita et al. .................. 123/549 |

Primary Examiner—Tony M. Argenbright
Assistant Examiner—M. Macy
Attorney, Agent, or Firm—Russell E. Baumann; Richard L. Donaldson; Rene' E. Grossman

[57] ABSTRACT

A heating system using a heating device 1 with a positive temperature coefficient thermistor 10 (PTC) is disclosed for the purpose of warming a carburetor/throttle body of an internal combustion engine and a timer device 20 using the PTC 10 for its control.

19 Claims, 9 Drawing Sheets

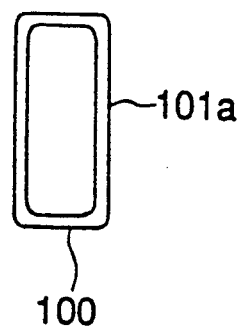
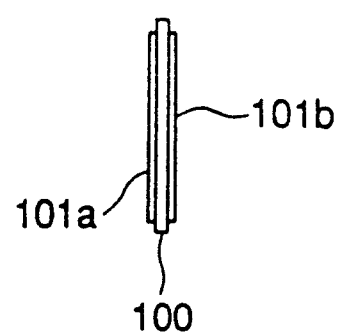
FIG. 2a.  FIG. 2b.
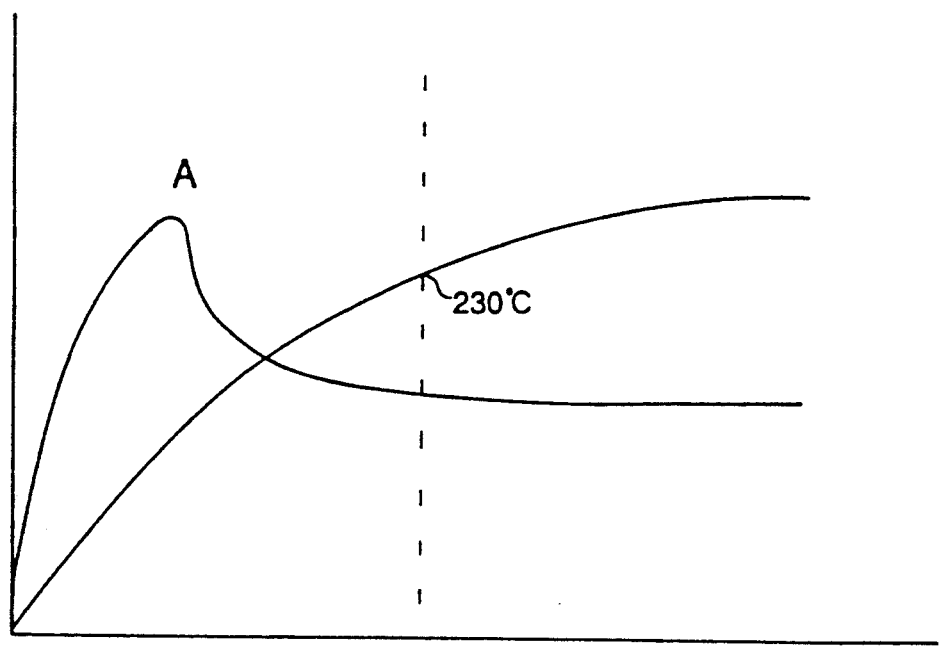
FIG. 3.

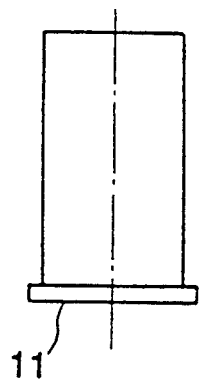
FIG. 9b.   FIG. 9c.
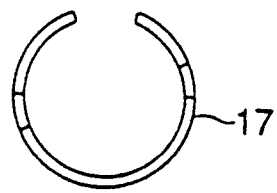
FIG. 10a.
FIG. 10b.

HEATING DEVICE AND SYSTEM FOR AN INTERNAL COMBUSTION ENGINE

This invention relates to a heating system and more particularly a system and device using a positive temperature coefficient (PTC) thermistor which is used for the purpose of warming the carburetor/throttle body of an internal combustion engine and controlling the timing of the system.

BACKGROUND OF THE INVENTION

It has been known in gasoline engines to use a heating device to prevent the freezing of the water content in air of the air/fuel mixture in a carburetor or the like (a phenomenon called icing) caused by the ambient temperature of the air or the evaporation heat of the gasoline, etc. When icing develops in the engine of a vehicle, there develops a condition which is tantamount to sudden braking which can result in an accident and thus, is a serious problem. Therefore, to prevent icing is an important consideration in engine design.

FIG. 16 shows a typical heating system for an internal combustion engine according to the prior art. Such a heating system uses a nichrome wire and/or the heated water from the cooling system of the engine for warming the carburetor. Typically, either a nichrome heater 50 or a warm water circulation type heater 51 is installed in the carburetor. For the sake of facilitating the explanation, a carburetor 40 with both of them being provided therein is shown.

First, a heating system for an internal combustion engine using a nichrome heater 50 will be described below. A nichrome heater is positioned adjacent that part of the fuel entry system which is cooled most such as an evaporator for the gasoline engine or throttle valve (not shown) of the carburetor 40. With the start-up of the engine, electrical current being supplied from the battery flows to the nichrome heater 50, with the result that the heater 50 warms the throttle valve and area around it thereby preventing possible icing of the carburetor.

Secondly, the heating system for an internal combustion engine, based on a warm water circulation type heater 51, will be explained below. With the start-up of the engine, water for the cooling of the engine is circulated through carburetor 40 as is indicated by the arrow in FIG. 16. As the temperature of the engine heats up, the temperature of the water for cooling also rises and then the carburetor 40 is warmed and icing is prevented by this cooling water. In some engines, oil is used for cooling purposes. In such a case, oil for cooling is employed in the place of water for cooling as described above.

FIG. 17 shows the use of a timer of the prior art for control of the electric current flowing through the nichrome heater 50. As shown in this figure, a timer circuit 60 comprises a crystal oscillator 61, a reference oscillation circuit 62 and a counting circuit 63. This timer circuit measures the time from start-up of the engine and controls a relay 65.

More specifically, crystal oscillator 61 is an element which oscillates at its intrinsic frequency. The reference oscillation circuit 62 is an oscillation circuit that generates an electric pulse which is in conformity with the intrinsic frequency of the crystal oscillator 61. The counting circuit 63 counts the pulses generated by the reference oscillator circuit 62 and then drives relay 65 at the time when a predetermined number of pulses has been reached. The relay 65 has a coil 66 and contact means 67 positioned between nichrome heater 50 and the electric power source. It is the relay circuit with relay 65 that controls operation of the nichrome heater. That is, the coil 66 is connected to timer circuit 60 and causes the opening and closing of contact means 67 in response to the output of the counting circuit 63.

Accordingly, after the start-up of the engine the reference oscillation circuit 62 generates a pulse of a frequency which is intrinsic to the crystal oscillator 61. This pulse is imputed into and counted by counting circuit 63. Upon the passage of a period of time after engine start-up, the pulse becomes constant, counting circuit 63 cuts off the electric current that flows to coil 66, thus contact means 67 opens and the electric circuit that flows to the nichrome heater is shut off.

If the coolant for the engine is used for heating, a temperature sensitive sensor such as a bimetal element can be provided to ultimately control the flow of such coolant.

The above described heating systems have had their problems.

In the case where a nichrome wire is used as a heating device, there is a need to cover the wire with an insulating material to provide electrical insulation from the body that contains the wire and the wire itself. This electrical insulation; however, greatly effects the transmission of the heat to the carburetor/body, thus limiting the efficiency of the system.

This inefficiency of the heating system becomes particularly troublesome in the case of a motor cycle where the electric generating capacity is small. In these cases, it has been difficult to generate sufficient heat. Additionally, because of the use of the insulating material, the size of the nichrome heater needs to be larger. At the same time, the diameter of the nichrome wire needs to be kept at a minimum to raise the resistance and heating value with the result that the wire lacks durability.

In the case of using engine coolant as a heat source, there is the problem of the initial start-up time period when the coolant is still not heated and, thus, the icing problem cannot sufficiently be prevented.

Still further, the timing system for the nichrome heater suffers from reliability problems due to the stringent environments in which it is employed in either an automobile engine area or a motorcycle engine.

Lastly, in the case where the electric current capacity of the nichrome heater is larger, the contact means must be large to carry the current; and correspondingly, the electric current that flows to the coil also is larger, thereby providing for large current consumption. Such a system is generally also large in size.

SUMMARY OF INVENTION

Accordingly, an object of this invention is to provide an improved heating device for an internal combustion engine heating system. Such a device will provide high thermal efficiently, small electric consumption while being small in size, highly reliable and highly durable in operation.

An aspect of this invention is to provide a heating device suitable for use in severe environment and which consumes less electrically by employing a timer using PTC member as a timer for the control of the heating system for the internal combustion engine. In accordance with an aspect of this invention, there is provided a heater device comprising a pair of heating elements that are positioned in such a manner to face each other, each element having first and second sides, a resilient electroconductive electrode terminal positioned to engage a first side of each of said heating elements, a pair of electrically conductive support members positioned to engage the second side of each of said heating elements and a heat sink means that encompasses said pair of support members.

In accordance with another aspect of this invention, the heating elements are thermistors of the positive temperature type.

In accordance with another aspect of this invention, a concave recess is formed on the first surface of the support members for receiving the heating elements and the second surface of each of the support members is semi-cylindrical so that the heat sink member having a cylindrical shape can be held in contact with the second surface of the support members.

In accordance with another aspect of the invention, an insulating means is positioned at one end of the cylindrically-shaped heat sink member and the electrode terminal is held by the insulating means.

In accordance with another aspect of this invention, the heating device has an electroconductive heat sink member containing PTC thermistor element means, either directly or indirectly in contact with the heat sink, and an electrode member contained within the heat sink member, insulated from the heat sink and in electrical contact with the thermistor element means for supplying voltage of one polarity to the device with heat sink functioning as the electrode of the other polarity.

For the purpose of achieving the aforementioned objective, the heating system for the internal combustion engine according to this invention comprises an internal combustion engine, an electric source, a heating device that heats a prescribed part of the aforementioned internal combustion engine and a timer which is connected between the heating device and the electric source and which cuts off the connection between the electric source and the heating device after the passage of a certain prescribed period of time.

As a suitable example, the aforementioned timer has a positive-property thermistor which is connected to the electric source, a displacement means and a switch part which cuts off the connection between the heating device and the electric source in response to the movement of the displacement member.

Further, the heating device comprises a pair of heating elements which are arranged in such a manner as to face each other, an electroconductive electrode terminal having a spring-like property and being arranged on the first side of each of the heating elements, a pair of electroconductive support members made of an electrical and thermally conductive material and having been arranged on the second side of each of the heating elements and a heat sink member that envelopes the pair of the support members.

In the heating device, the stand-up property of the temperature elevation has been improved by using a PTC as a heat source. In addition, the electric power to be consumed after the elevation of the temperature is reduced. Since there is no need to cover it with an insulating material, the heat efficiency becomes higher and the size becomes smaller. In addition, the freedom of the position for the arrangement of the engine (carburetor) has been increased by directly grounding to the carburetor (engine) through the electroconductive heat sink.

Moreover, assembling becomes easier since the various parts of the heating device are symmetrical in shape.

In the PTC timer which is employed with the heating device for the internal combustion engine, the heat that is generated by the PTC is detected by the bimetal and the driving contact is opened or closed, thereby reducing the electric current to be consumed and its size as well.

DESCRIPTION OF THE DRAWING

Other objects, advantages and details of the heater and control system of this invention appear in the following detailed description of the preferred embodiments of the invention, the detailed description referring to the drawings in which:

FIG. 2A shows a front view of the heating element of FIG. 1;

FIG. 2B shows a side view of the heating element of FIG. 1;

FIG. 3 shows the current characteristics and the temperature characteristics of the heating element;

FIG. 7;

FIG. 9B shows a front view of the support member of FIG. 7;

FIG. 9C shows a side view of the support member of FIG. 7;

FIG. 10A shows a top view of the earth ring of FIG. 7;

FIG. 10B shows a partial section view of the earth ring of FIG. 7;

DETAILED DESCRIPTION OF THE PREFERRED EMBODIMENTS

Figure 1:
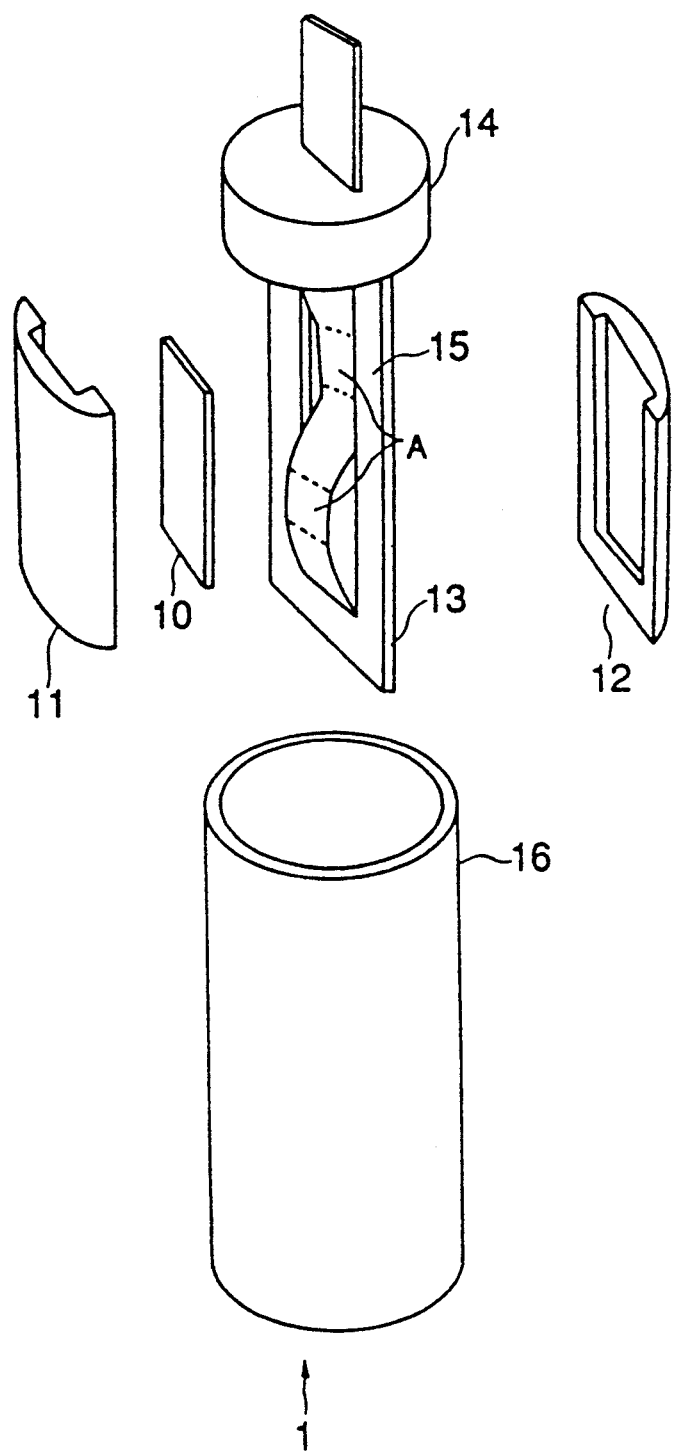
FIG. 1 shows an exploded view of the construction of the heating device according to this invention.

FIG. 1 shows the construction of a heating device according to this invention. Heating device 1 has a pair of heating elements 10 (only one element is shown), a pair of support members 11 and 12, an electrode support member 13, an insulator member 14, an electrode member 15 and a heat sink member 16.

The heating elements 10 are preferably a positive temperature coefficient thermistor (PTC) which is of a generally parallelepiped shape with the first and second opposite major surfaces. Both of these surfaces of heating element 10 are coated with an electrically conductive material such as silver with the minor surfaces that link these opposing major surfaces acting as an insulating layer between them.

Support members 11 and 12 are electrically and thermally conductive members with a first external generally semicylindrical shape so that the two support members when assembled together in the heating device will have a cylindrical outer shape. Such support members typically are made from aluminum, brass, or the like. The second inner surface of each of the members has a recess of a predetermined size to securely contain one of the heating elements 10 with one of the major surfaces of the element in direct electrical contact with the inner wall of the recess of the respective support member. The support members 11, 12 when assembled are dimensioned to tightly fit within and be in contact with the inner wall of cylindrical heat sink 16.

Electrode support member 13 is typically made of an insulating material such as an insulating resin with an opening formed in the center thereof, and preferably integrally resin molded with an insulator 14 which will be described below. Inside the opening in electrode support member 13, a thin, S-shaped serpentine configuration electrode member 15 made of electroconductive spring material such as beryllium copper, etc., is arranged.

One end of electrode member 15 is contained in and extends out the top of the insulator. The other end of electrode member 15 is bent in such a manner to form two planes (A) that protrude in two mutually different directions along its axis, with these planes (A) constituting an electrode contacting surface that contacts the surface of respective heating elements 10. Both electrode surfaces A are desirably of the same configuration and protruding for the same distance from the axial direction.

Heat sink 16 is a cylindrical member consisting of an electrically and thermally conductive material such as aluminum, etc. One end is open through which heating elements 10, support members 11 and 12 and electrode member 15, etc., are accommodated inside. The insulator 14 made of a heat resistant insulating material is molded in the shape of a cylinder with its diameter dimension such that the insulator 14 is firmly contained in the open end of the heat sink 16, thereby making it possible to tightly close heating device 1 from the outside.

The installation of insulator 14 is not limited to the method as described above, but may also be done by using other conventional methods. Additionally, there is no need for the electrode support member 13 to be made integrally with insulator 14.

Heating device 1 is assembled by using the constituent parts as described above. In this state, positive voltage is impressed to the electrode member 15 protruding from the top of the insulator 14, with the heat sink 16 being the ground for the circuit. The heating elements 10 and the support members 11, 12 which are arranged on both sides of the electrode member 15 are elastically compressed by each electrode surface (A) of the respective electrode member 15, with a consequence that each heating element 10 is tightly held to the concave parts of the respective support members 11, 12 and, at the same time, the semi-cylindrical surfaces of the support members 11, 12 are also suitably pressed to the inner walls of the heat sink 16.

In addition, the heating elements 10 and the support members 11, 12 are made symmetrical relative to the electrode support member 13 and, if the electrode surfaces (A) of the electrode member 15 are of the same shape, the heating elements 10 are pressed by balanced compressive forces which are substantially the same.

Because of the above, the electric power that is supplied to the heating elements 10 will be uniform with a result that uniform heat can be expected from the heat sink 16.

In view of the fact that the compressive forces are symmetrical within the device, any possible vibration or displacement of the support members 11, 12 under the influence of an impact or a vibration from outside can be prevented. Even if there is any such influence, the electrical insulation or excessive displacement between the support members 11, 12 can be prevented by the electrode support member 13.

Heating element 10 is more clearly shown in FIG. 2. Element 10 has electroconductive surfaces 101a and 101b formed on PTC thermistor 100 which is in the shape of a parallelepiped. As a voltage is impressed between electrodes 101a and 101b, electric current is caused to follow between them with the PTC thermistor 100 generating heat.

In the case where heating device 10 is used in a heating system for the internal combustion engine, the size of heat sink 16 has a diameter of the open part of approximately seven millimeters and the length of approximately 17 millimeters. A heating element 10 used in such a device has a length of approximately nine millimeters, a width of approximately four millimeters and a thickness of approximately one millimeter.

Heating device 1 is assembled by first inserting the two elements into the recess parts of support members 11, 12. Next, the electrode support member 13 is sandwiched between the support members 11, 12 and these components are inserted into heat sink 16 with one end of electrode member extending out from the top.

In operation, a positive voltage is supplied to the electrode member 15. The electric current then flows through the heating elements 10, support members 11, 12 and heat sink 16. The heat sink is connected to ground typically being in contact with the engine. The heat that is generated by heating elements 10 is transmitted to the carburetor (from heating elements through support members to heat sink). The heat sink portion of the heating device is directly in contact with the carburetor to provide high heat conductivity and minimize the size of the heating device.

Many variations to heating device 1 could be made. For example, only one heating element may be used with a dummy insulator used in place of the other heater. Further, the electrode support member 13 has been described as having an open part. However, it may also be constructed in a solid piece with the electrode members being arranged on one or both surfaces facing the support members containing the heating elements. Even though heating element 10 is in the form of a plate, it may have some different configuration, if such necessity arises.

The benefits of heating device 1 are as set forth below.

Since the construction of the first heating device 1 is symmetrical, assembling operation can be easily carried out. Further, manufacturing can be facilitated in view of the fact that the heating elements 10 and the support members 11, 12 that receive the heating elements 10 have a flat surface.

Figure 16:
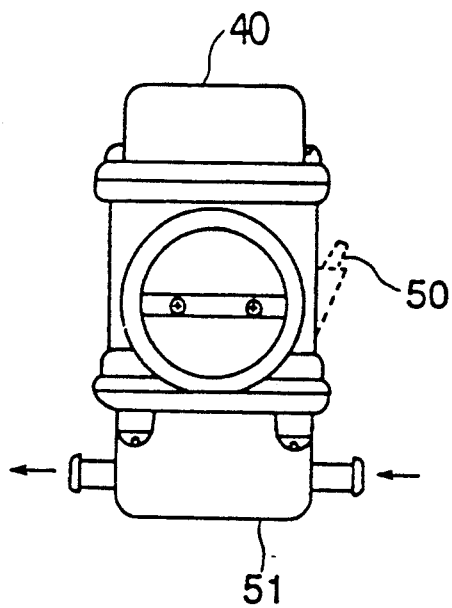
FIG. 16 shows a heating system for an internal combustion engine according to the prior art.

The use of PTC thermistor 100 as the heating element 10 adds to the high durability of the device as compared with the nichrome heater 50 which is shown in FIG. 16. Also, the size of the heating device 1 is small and compact in size.

Structurally, moreover, it becomes possible to effect direct electric grounding by the heat sink 16. Because of this, when it is applied to the carburetor of the automobile, electric grounding can be achieved merely by fixing the heat sink 16 to the carburetor 40, thereby making it easier to install it on the carburetor 40 and, moreover, there is no need to provide a grounding electrode in the heating device 1.

Still further in view of the fact that the support members 11, 12 that are arranged between the heating elements 10 and the heat sink 16 are made of a metal, heat conductivity is high and the heat efficiency is high as compared with the case where a nichrome heater 50 is used as in the prior art. Also, since heating device 1 is tightly closed by using an insulator 14, it becomes possible to fill the heating device 1 with silicone grease, etc., thus increasing the heat conductivity of the heating element 10 and heat sink 16, thereby elevating the heat efficiency.

Inasmuch as electrode member 15 is arranged in such a manner as to be sandwiched by the heating elements 10, there is no possibility for the electrode part 15 to contact the support members 11, 12 and heat sink 16. Because of this fact, there is no need for insulation other than the electrode support member 13 with insulator, thereby simplifying the construction.

Due to the fact that electrode member 15 has a symmetrical shape, there is no need to be concerned about directionality at the time of installation.

Also, electrode member 15 and its configuration provides for low contact resistance engagement with heating element 10. Lastly, the case where only one heating element 10 is to be used and one of the two heating elements 10 has been replaced by an insulator, heat generation develops a directional character which is suitable for local, specific heating (used as a spot heater).

FIG. 3 shows the current characteristics and the temperature characteristics of the heating element 10.

In FIG. 3, the axis of the ordinates shows the electric current that flows to PTC thermistor 100 and the temperature of the heating element 10 and the axis of abscissas shows the time.

In view of the fact that heat is generated in the heating element 10 as the electric current flows to the PTC thermistor 100, the resistance value increases along with the elevation of the temperature (the temperature coefficient of the resistance value is positive).

Because of the above situation, a large electric current flows immediately after the application of electric power, with such a peak as shown at point A in FIG. 3. The length of time between the initiation of electric passage and the appearance of this peak is several seconds. At this time, the temperature of the heating element 10 has risen to the neighborhood of the operational use temperature.

The heating element 10 reaches a high temperature within a short period of time as a large electric current flows at the time when it is at a low temperature. Along with an elevation of the temperature, the resistance value of the PTC thermistor 100 increases, with a result that the electric current that flows to the positive-property thermistor 100 is reduced, and the temperature elevation becomes milder, finally reaching a state of equilibrium. In other words, the electric current has a function of automatic adjustment. It is mentioned in this connection that the temperature used in the first example is approximately 230 degrees centigrade as is shown in the drawing.

The positive temperature characteristics of the resistance value of the PTC thermistor 100 as described above are also observed in connection with the nichrome wire. In the case where a positive-property thermistor 100 is employed, however, such characteristics are markedly observed and there is a quick elevation of the temperature (the stand-up characteristics of the temperature elevation are satisfactory) as compared with the case of a nichrome heater 50 as described earlier.

Moreover, since the electric current requirements after the temperature elevation becomes less than with nichrome heater 50 and since there is no need to cover the heating element 10 with an insulating material, the heat efficiency is high. In the case of a comparison between the first heating device and a nichrome heater 50 having the same temperature capacity, the electric power consumed by the heating device 1 is approximately 30 percent less than what is consumed by earlier described nichrome heater 50.

Figure 4:
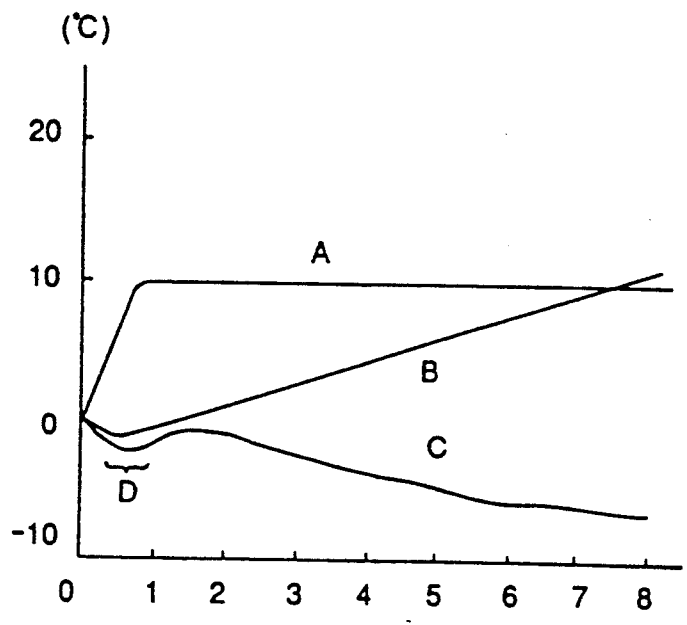
FIG. 4 shows the actual experimental measurement and comparison of the carburetor temperature amongst the case where the heating device of FIG. 1 was used as the heating system for the internal combustion engine, the case where a heater of the warm water circulation system was used and the case where no heating system for the internal combustion engine was used.

FIG. 4 shows a comparison of the temperatures of the carburetor 40 as measured in an experiment where the heating device 1 was used in the heating system for the internal combustion engine and where heater 51 of the warm water circulation type was used in the heating system and where no heating system for the internal combustion engine was used at all.

In FIG. 4, the axis of ordinates indicates the temperature of the carburetor 40 and the axis of abscissas shows the length of time elapsed after the start-up of the engine.

(A) in the drawing is a curve showing the temperature variations where the heating device 1 is used. Approximately one minute afterwards, the temperature of the carburetor 40 is stabilized in the neighborhood of 10 degrees centigrade, with no icing being developed.

(B) in the drawing is a curve showing the change in the temperature where a heater 51 of the warm water type was used. The temperature of the carburetor 40 comes down once after the start-up of the engine. At this juncture, icing develops at the time which is indicated by (D).

(C) in the drawing is a curve showing the variations in the temperature in the case where no heating system is used for the internal combustion engine. The temperature of the carburetor 40 rises once after the start-up of the engine. Thereafter, however, the temperature comes down gradually, with icing developing during the entire period of time shown in the drawing.

As is clearly observed by referring to FIG. 4, when the heating device 1 is used in the heating system for the internal combustion engine, it becomes possible to obtain a marked effect of icing prevention in addition to the advantages described above.

Figure 5:
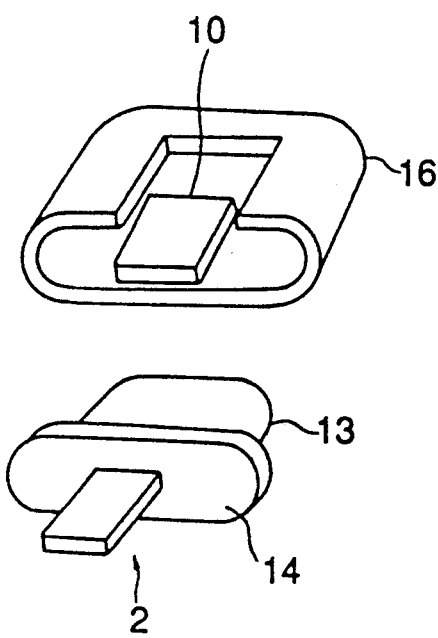
FIG. 5 shows an exploded view of the construction of a second embodiment of a heating device of this invention.

A second embodiment according to this invention as shown in FIG. 5 has a heat sink which has been formed with a flat shape as compared with the heat sink 16 of the heating device 1. By forming heat sink 16 in this fashion, the outer surface of the heat sink opposite the heating element 10 is arranged to contact the carburetor 40 more closely and with greater area of contact.

The heat sink 16 of heating device 2 is formed smaller than the heat sink 16 of the heating device 1 and this facilitates its application to a comparatively small-sized engine such as the engine of a motor cycle, motor-powered bicycle, etc.

The electrode support member 13 and insulator 14 are formed to conform to the shape of the heat sink 16. It is mentioned in this connection that the electrode member (which is not shown in the drawing) is arranged on the lower surface of the electrode support member 13.

In heating device 2, which is different from heating device 1, the heating element 10 is directly pressed and fixed to the heat sink 16 by the aforementioned electrode member without the support members 11 and 12.

The construction other than what has been described above is the same as the heating device 1.

Figure 6:
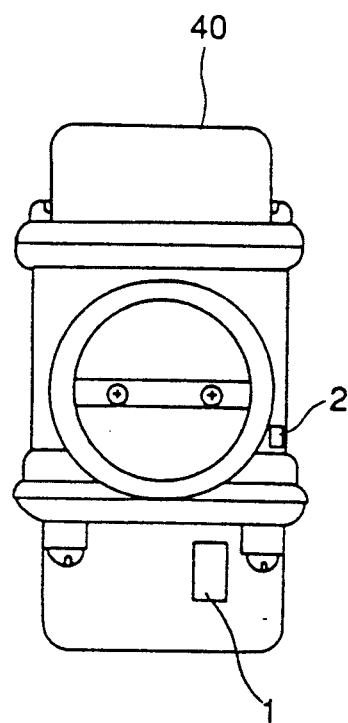
FIG. 6 shows a carburetor and the positioning of the first and second heating devices on it.

FIG. 6 shows the portion of carburetor 40 where the heating device 1 and heating device 2 are typically arranged.

The heating device 1 is inserted into and arranged in a hole which is formed at a location in the general neighborhood of the throttle valve of the carburetor 40.

The heating device 2, on the other hand, arranged on the surface of the carburetor 40 at a location which is close to the throttle valve of the carburetor 40, can provide added advantages.

Figure 7:
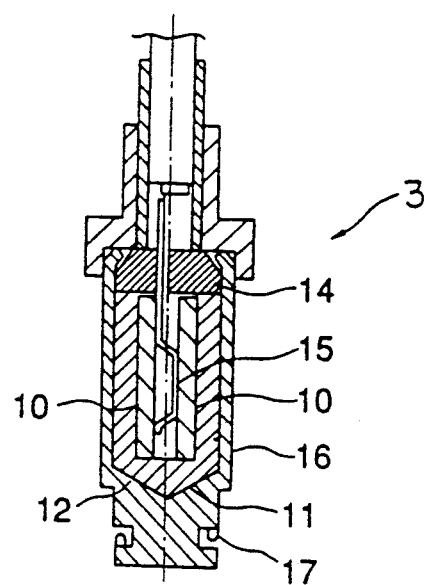
FIG. 7 shows a cross-sectional view of a third embodiment of a heating device of this invention.

FIG. 7 shows a third embodiment of heating device 3 according to this invention.

The heating device 3 is similar to heating device 1, with the shapes of its various parts being modified and its constructional effect being modified. Typically, the size of the third heating device 3 is approximately the same as the first heating device 1.

In FIG. 7, a grounding (earth) ring 17 is a ring-shaped member that has been arranged in a groove formed at one end of the heat sink 16. By arranging the earth ring 17 in the aforementioned groove of the heat sink 16 to be installed in the carburetor, the electrical grounding of the third heating device 3 can be effected more accurately.

Figure 8A:
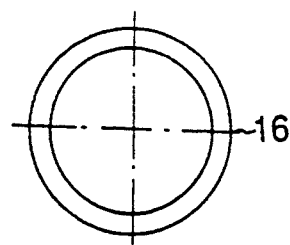
FIG. 8A shows a top view of the heat sink member of FIG.
Figure 8B:
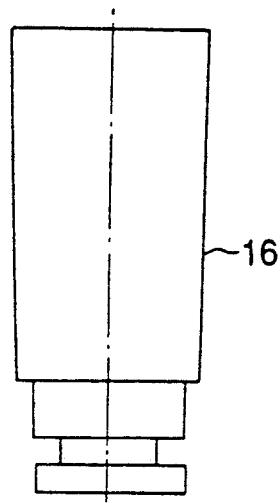
FIG. 8B shows a front view of the heat sink member of FIG. 7.
Figure 8C:
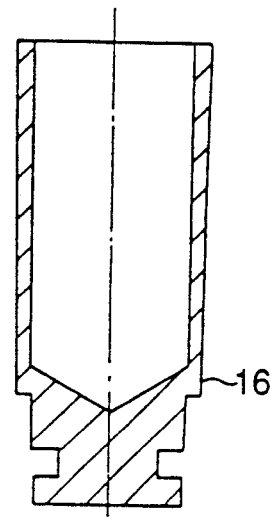
FIG. 8C shows a cross-sectional view of the heat sink member of FIG. 7.

FIG. 8 shows the shape of the heat sink 16 of the third heating device 3.

In FIG. 8, (A) is a plane figure of the heat sink 16; (B) is a front view of the heat sink 16; and (C) is a longitudinal section of the heat sink 16.

As compared with the heat sink 16 of the first heating device 1, the heat sink 16 of the third heating device 3 has the following features:

The outer shape of the heat sink 16 is tapered toward its tip. Because of this, it becomes easier to install same on the carburetor. In addition, there is provided a tight fit between the installation surface of the carburetor and the surface of the heat sink 16.

In addition, there is provided a difference in diameter in the axial direction at the tip of the heat sink 16. This difference in diameter plays the role of a stopper and electric grounding at the time when the heating device 3 is installed on the carburetor.

In addition, there is provided a groove for the arrangement of the earth ring 17 at the tip of the heat sink 16.

Figure 9A:
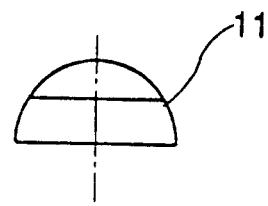
FIG. 9A shows a top view of the support member of FIG. 7.

FIG. 9 shows the shape of the support member 11 of the third heating device 3.

In FIG. 9, (A) is a plane figure of the support member 11 and (B) is a front view of the support member 11. In addition, (C) is a side view of the support member 11.

It is mentioned that the support member 12 has the same shape.

FIG. 10 shows the shape of a grounding ring 17. In FIG. 10, (A) is a plane figure of the grounding ring 17. (B) indicates a front view of the earth ring 17.

The grounding ring 17 has a structure which resembles a circle with a part thereof cut out, thereby making it easier for same to be arranged in the aforementioned groove of the heat sink 16.

It is added here that the heating element 10 has the same shape as the first heating device 1.

The other parts of the third heating device 3, for which no explanation has been given here, have the same shapes as the various corresponding parts of the first heating device 1.

Inasmuch as the third heating device 3 has a structure as described above, it goes without saying that it has the features and effects of the first heating device in addition to the effects described in connection with the shape of the heat sink 16.

Figure 11:
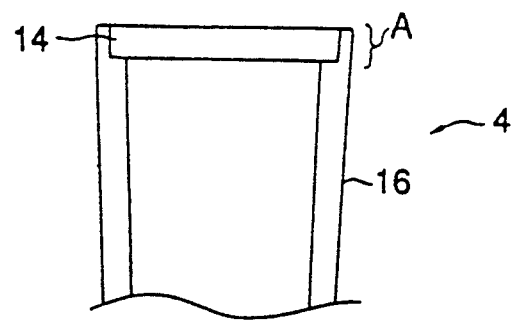
FIG. 11 shows the configuration of a heat sink member and an insulator member for a fourth embodiment of the present invention.

A fourth embodiment is similar to the third embodiment set forth above; but as FIG. 11 shows, the shapes of the heat sink 16 and the insulator 14 have been modified.

Typically, the size of the heating device 4 is approximately the same as the heating device 1.

Also as shown in FIG. 11, a difference in diameter is provided on the inner surface near the open part of the heat sink 16 of the heating device 4. By providing such a difference in diameter, the insertion of the insulator 14 becomes easier to carry out; and it serves the role of a stopper after the insulator 14 has been inserted into the heat sink 16 to a prescribed position.

The other parts of the heating device 4 are omitted from FIG. 11, but would be similar to heating device 3.

Since the heating device 4 is constructed in such a manner as has been described above, it goes without saying that it possesses the features and effects possessed by the heating device 3 in addition to the features and effects as described here.

Figure 12:
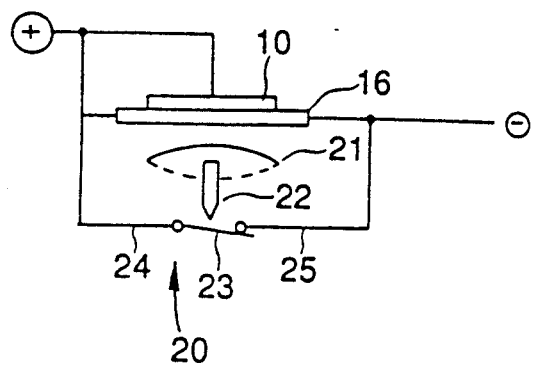
FIG. 12 shows the construction of a PTC timer used in the heating system for an internal combustion engine according to this invention.

FIG. 12 shows the construction of a timer 20 (PTC timer 20) which is used in the heating system for the internal combustion engine according to this invention.

In FIG. 12, the heating element 10 is similar to the element 10 used in heating devices 1–4 heretofore described. In this case, however, it is used in PTC timer 20. It is constructed to have an electric current value and action temperature which are lower than when used in the heating device and its shape conforms to the PTC switch 20.

The heat sink 16 transmits the heat that has been generated in the heating element 10 to bimetal 21.

The bimetal 21 reacts to the heat of the heating element 10 so as to snap over center when reaching a preselected temperature which drives a transfer pin 22 and opens a switch 23. When the bimetal 21 snaps back to its original position, switch 23 will again close.

Transfer pin 22 transmits the displacement of the bimetal 21 to the switch 23.

The switch 23 effects a connection or a cut-off between the electric wires 24 and 25.

The operation of PTC timer 20 is described below with reference to FIG. 12.

In the case where the temperature of the bimetal is below a certain value, the shape of the bimetal 21 is as shown by a solid line in the drawing. In addition, the switch 23 is closed and the electric wires 24 and 25 are connected.

When an electric current flows to the heating element 10, its heat is transmitted to the bimetal 21 through the heat sink 16 and when the temperature of the bimetal becomes higher than a certain value, the bimetal 21 is displaced to a shape shown by the dotted line in the drawing.

The displacement or snap of the bimetal 21 is transmitted to the switch 23 through the transfer pin 22. As a result of this, the contact point of the switch 23 opens and the electrical connection between electric wires 24 and 25 is broken.

This state is maintained until bimetal reaches a certain lower reset temperature when it snaps back to its original position.

The operating characteristics of PTC switch 20 can be modified by modifying the action temperature of the heating element 10, the amount of heat generated, thickness of the heat sink 16, and the activation temperature of the bimetal 21, etc.

Figure 13:
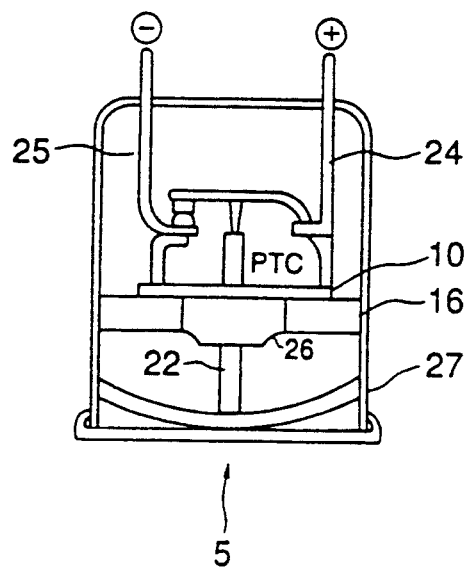
FIG. 13 shows a cross-sectioned view of a PTC switch according to this invention.

FIG. 13 shows the actual construction of a second PTC switch 5.

In FIG. 13, the insulator 26 is an insulating member that insulates the transfer pin 22 and the heat sink 16.

Casing 27 is a casing that accommodates the various parts constituting the PTC switch 5.

The various parts of PTC switch 5, other than those mentioned above, are the same as the various parts of the PTC switch 20. PTC switch 5 is a PTC switch which typically handles a comparatively large electric current.

Figure 17:
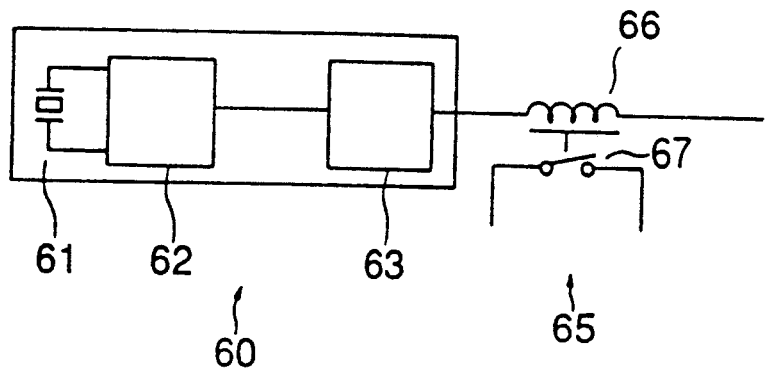
FIG. 17 shows a timer for control of electric current to be supplied to a heater device according to the prior art.

PTC switch 5 does not have a relay 65 (FIG. 17) and since it realizes a similar action of the timer circuit 60 without an electronic circuit, it can be made much smaller.

Figure 14:
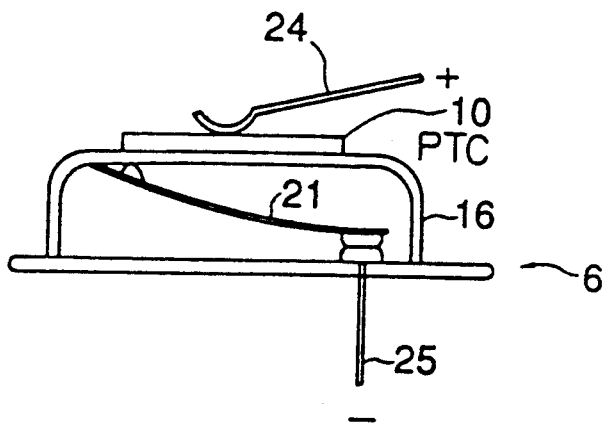
FIG. 14 shows a cross-sectioned view of a second embodiment of a PTC switch according to this invention.

FIG. 14 shows the construction of a third PTC switch 6 also similar in function to a PTC switch 20.

PTC switch 6 is a PTC switch which typically handles a comparatively small electric current. As compared with the PTC switch 5, it is so constructed that the transfer pin 22 is omitted, the heat sink 16 also serves the purpose of the casing 17 and the bimetal 21 serves the purpose of a switch 23.

In view of these changes, PTC switch 6 can be made much smaller than PTC switch 5, with correspondingly small electric power consumption so that it can be suitable in the small-sized engine applications.

The features of the PTC switch which has been described above will be further described below:

By modifying the actuation temperature, the amount of heat generated, the thickness of the heating element 10, the thickness of the heat sink 16 and the actuation temperature of the bimetal 21, etc., the time between the initiation of the electric passage to the heating element 10 and the opening of the switch 23 (or the action time) can be set in a wide range.

Since a positive-property thermistor is used for the heating element 10, the aforementioned action time changes with the ambient temperature. In other words, when the ambient temperature is low and thus the temperature of the carburetor 40 is low at the startup of the engine, there is a longer delay in the time until the opening of switch 23; whereas when the ambient temperature is high, the opening time of the switch 23 becomes shorter. Accordingly, it is suitable for the control of a heating device of the heating system for an internal combustion engine to be used for de-icing.

Additionally, when the temperature of the heating element 10 and the bimetal 21 once rises, the electric current value that flows through the heating element 10 automatically becomes smaller, with a result that only a little electric current is required for the maintenance of the switch 23. Therefore, there is no need to control the electric current that flows to the heating element 10 for the PTC switch 20.

Figure 15:
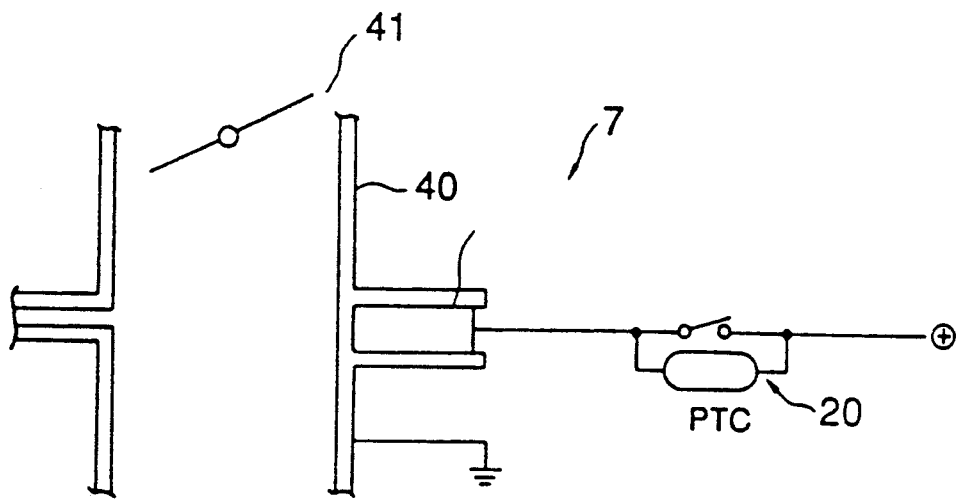
FIG. 15 shows a heating system for an internal combustion engine according to this invention.

FIG. 15 shows the construction of a heating system for an internal combustion engine according to this invention.

In FIG. 15, the heating device has been arranged near or directly to the throttle valve 41 of the carburetor 40. Either the heating device 1, 2, 3 or 4 is selected in conformity with the scale of the engine to be used, etc.

The PTC switch 20 is the timer that carries out the control of the aforementioned heating devices and can be in the form of switch 5 or switch 6, depending on the type of engine with which it is used.

When the engine (not shown on the drawings) is started up, the electric current flows to the PTC switch 20 and the aforementioned heating devices from an electric source such as a battery in an automobile.

When the heating device is heated, the carburetor 40 is warmed and de-icing is carried out. At the same time, the temperature of the heating element 10 of the PTC switch also rises.

At the time when the temperature of the bimetal 21 of the PTC switch 20 has exceeded a certain preselected value, the switch 23 of the PTC switch 20 opens and the electric current that is supplied to the aforementioned heating device will be only the small amount of electric current that is required for the status maintenance of the PTC switch 20.

Consequently, the PTC switch 20 is so construed that switch 23 is open other than that period of time that is required for the sufficient rise in the temperature of the carburetor 40 after the start-up of the engine.

Along with a rise in the temperature of the engine after the start-up of the engine, the temperature of the carburetor 40 also rises, with a result that icing will no longer develop even without the heating of the aforementioned heating device.

The heating system 7 for the internal combustion engine, that has been described above, is suitable as a heating system for the internal combustion engine for use in the air-cooled engine where neither water nor oil is used for cooling, and where it is not possible to control the aforementioned heating device by the detection of the temperature of the aforementioned water or oil.

The features of the heating system 7 for the internal combustion engine are as described below:

By using PTC switch 20 as a switch for the control of the heating device, the heating system can be small-sized, superior in resistance to environmental conditions and for versatility as compared with the conventional technology.

This heating system can provide the desired de-icing under variable ambient temperature conditions.

In addition, the electric current required for the maintenance of the switch 23 is small as compared with the case of the prior art switch and relay 65.

Accordingly, the heating system with heating device and PTC timer used therein of this invention for the internal combustion engine as described above provides many unique advantages. The heating device has high heat efficiency, small electric consumption, while being compact in size, highly reliable and durable in operation as part of the heating system for the internal combustion engine. The PTC timer is also small in size and highly reliable and in conjunction with the heating device, provides a heating system with great versatility and superior resistance to environmental problems while requiring small power requirements.

It should be understood that although particular embodiments of this invention have been described by way of illustrating the invention, the invention includes all modifications and equivalences of the disclosed embodiments falling within the scope of the appended claims.

I claim:

1. A heating device for use with an internal combustion engine comprising a pair of heating elements each having first and second electrical contact faces positioned in said device so that each of said elements has its first contact face facing the other element's first contact face, a resilient, electrically conductive terminal member for making electrical contact with the first contact face of each of said elements, an electrically and thermally conductive pair of support members positioned so that each support member makes electrical contact with the second contact face of a different one of said two heating elements and a thermally and electrically conductive heat sink member that contains said support members and is in electrical serial connection with said support members, said heating elements and said terminal member.

2. A heating device according to claim 1 wherein said heating elements are positive temperature coefficient thermistor heat elements.

3. A heating device according to claim 2 wherein each of said support members has a generally semi-cylindrical configuration with an inside and outside surface, said inside surface of each of said support members having a cavity for receiving one of said heating elements and said outside surface being received in close contact by said heat sink member, said heat sink member having an interior surface configuration closely resembling said outside surface of said support members to provide good thermal transfer from said heating elements to said heat sink member.

4. A heating device according to claim 2 wherein said terminal member is made of spring type material and has a generally S-shaped serpentine configuration with a central axis with two planar surfaces, one of said planar surfaces on each side of said axis, each planar surface being spring, biased to make reliable contact with the first contact first of one of said heating elements.

5. A heating device according to claim 2 wherein said planer surfaces are generally equidistant from said central axis of said terminal member.

6. A heating device according to claim 2 wherein one of said pair of heating elements is removed or replaced with an insulating element to provide a localized spot heater.

7. A heating device according to claim 2 wherein said heat sink member has a generally hollow cylindrical configuration being closed at one end and open at the other, said open end receiving an insulating member which fills the open end of the heat sink member and contains said terminal member, said terminal member extending in a first direction from said insulating member externally out of the heat sink member for connecting electrical current to the heating device and extending in an opposite second direction from said insulating member within the heat sink member to make electrical contact with said heating elements.

8. A heating device for use with an internal combustion engine comprising a pair of positive temperature coefficient thermistor heating elements each having first and second electrical contact faces positioned in said device so that each of said elements has its first contact face facing the other element's first contact face, a resilient terminal member having a generally S-shaped serpentine configuration with a central axis with two planar surfaces one on each side of said axis, each planar surface being spring biased to make reliable contact with the first contact surface of one of said heating elements, an electrically and thermally conductive pair of support members positioned so that each support member makes electrical contact with the second face of a different one of said two heating elements and an electrically and thermally conductive heat sink member that is electrically connected with said support members, said heating elements and said terminal members.

9. A heating device according to claim 8 wherein said planer surfaces are generally equidistant from said central axis of said terminal member.

10. A heating device according to claim 8 wherein one of said pair of heating elements is removed or replaced with an insulating element to provide a localized spot heater.

11. A heating device according to claim 8 wherein each of said support members has a generally semi-cylindrical configuration with an inside and outside surface, said inside surface of each of said support members having a cavity for receiving one of said heating elements and said outside surface being received in close contact by said heat sink member, said heat sink member having an interior surface configuration closely resembling said outside surface of said support members to provide good thermal transfer from said heating elements to said heat sink member.

12. A heating device according to claim 8 wherein said terminal member extends out from said heat sink member and is insulated from said heat sink member and acts as a first electrical connection means for the device and the heat sink member acts as a second electrical connection means.

13. A heating device according to claim 12 wherein there are no support members and said heating elements are in direct contact with said heat sink member.

14. A heating system comprising an internal combustion engine, an electric source, a heating device connected to said electric source for heating a prescribed part of said internal combustion engine, said heating device comprising a pair of heating elements each having first and second electrical contact faces positioned in said device so that each of said elements has its first contact face facing the other element's first contact face, a resilient, electrically conductive terminal member for making electrical contact with the first contact face of each of said elements, an electrically and thermally conductive pair of support members positioned so that each support member makes electrical contact with the second face of a different one of said two heating elements and a thermally and electrically conductive heat sink member that contains said support members and is in electrical serial connection with said support members, said heating elements, said terminal member, and a timer switch means which is connected between said heating device and said electric source to make and break electrical connection between the electrical source and the heating device after the passage of a certain period of time.

15. A heating system according to claim 14 wherein said timer switch means has a positive temperature coefficient thermistor connected to said electric source, a displacement means in heat transfer relation with said thermistor comprising a snap-acting thermostatic element responsive to heat from said thermistor and switch contact means adapted to make and break electrical connection between said electric source and said heating device upon movement of said thermostatic element.

16. A heating system according to claim 15 wherein said planer surfaces are generally equidistant from said central axis of said terminal member.

17. A heating system according to claim 15 wherein one of said pair of heating elements is removed or replaced with an insulating element to provide a localized spot heater.

18. A heating system according to claim 15 wherein each of said support members has a generally semi-cylindrical configuration with an inside and outside surface, said inside surface of each of said support members having a cavity for receiving one of said heating elements and said outside surface being received in close contact by said heat sink member, said heat sink member having an interior surface configuration closely resembling said outside surface of said support members to provide good thermal transfer from said heating elements to said heat sink member.

19. A heating system according to claim 15 wherein said heat sink member has a generally hollow cylindrical configuration being closed at one end and open at the other, said open end receiving an insulating member which fills the open end of the heat sink member and contains said terminal member, said terminal member extending in a first direction from said insulating member externally out of the heat sink member for connecting electrical current to the heating device and extending in an opposite second direction from said insulating member within the heat sink member to make electrical contact with said heating elements.

* * * * *